(12) United States Patent
Chen et al.

(10) Patent No.: US 10,222,668 B2
(45) Date of Patent: Mar. 5, 2019

(54) LIQUID CRYSTAL DISPLAY PANEL AND LIQUID CRYSTAL DISPLAY DEVICE

(71) Applicant: Shenzhen China Star Optoelectronics Technology Co., Ltd., Shenzhen, Guangdong (CN)

(72) Inventors: Wei Chen, Guangdong (CN); Xiaoping Tan, Guangdong (CN); Zhenzhou Xing, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/418,612

(22) PCT Filed: Jan. 21, 2015

(86) PCT No.: PCT/CN2015/071244
§ 371 (c)(1),
(2) Date: May 10, 2016

(87) PCT Pub. No.: WO2016/106904
PCT Pub. Date: Jul. 7, 2016

(65) Prior Publication Data
US 2016/0246147 A1    Aug. 25, 2016

(30) Foreign Application Priority Data
Dec. 31, 2014    (CN) .......................... 2014 1 0856585

(51) Int. Cl.
*G02F 1/133*    (2006.01)
*G02F 1/1362*    (2006.01)
*G02F 1/1368*    (2006.01)

(52) U.S. Cl.
CPC ...... *G02F 1/136286* (2013.01); *G02F 1/1368* (2013.01); *G02F 1/13624* (2013.01); *G02F 1/136213* (2013.01); *G02F 2203/30* (2013.01)

(58) Field of Classification Search
CPC .. G09G 3/3648; G09G 3/3611; G09G 3/3655; G09G 3/3677; G09G 3/3688;
(Continued)

(56) References Cited

U.S. PATENT DOCUMENTS 5,610,739 A * 3/1997 Uno .................. G02F 1/136213
349/144
6,952,244 B2 * 10/2005 Cairns ............... G02F 1/136213
257/59
(Continued)

FOREIGN PATENT DOCUMENTS

| CN | 1469175 A | 1/2004 |
|---|---|---|
| CN | 1734331 A | 8/2005 |

(Continued)

OTHER PUBLICATIONS

International Search Report and Written Opinion, dated Jan. 21, 2015, China.
(Continued)

*Primary Examiner* — Thoi Duong
(74) *Attorney, Agent, or Firm* — Andrew C. Cheng

(57) ABSTRACT

A liquid crystal display panel and a liquid crystal display device are provided. The liquid crystal display panel has a plurality of scan lines, and a plurality of data lines, which coordinate with the scan lines to form a plurality of subpixel regions. Each subpixel region is provided with a subpixel, and each subpixel comprises a plurality of display regions, areas of the display regions being different from each other. When a scan signal transmitted through the scan line arrives, the display regions each receive a data signal transmitted
(Continued)

through a same data line, so that the display regions have different gray scale voltages.

14 Claims, 3 Drawing Sheets

(58) Field of Classification Search
CPC .. G09G 3/2025; G09G 3/2074; G09G 3/2085; G09G 3/3666; G09G 3/3659; G09G 2300/0426; G09G 2300/0443; G09G 2300/0452; G09G 2300/08; G09G 2300/0876; G09G 2320/0219; G09G 2320/0276; G09G 2320/0233; G09G 2320/0626; G09G 2320/0673; G09G 2320/0686; G09G 2320/10; G09G 2310/027; G09G 2310/0213; G09G 2310/0221; G09G 2310/02; G09G 2310/0202; G09G 2310/0262; G09G 2310/0281; G09G 2340/0407; G09G 2340/0442; G02F 2001/134345; G02F 2001/134354; G02F 2001/136222; G02F 1/1343; G02F 1/134336; G02F 1/136; G02F 1/1362; G02F 1/136213; G02F 1/134309; G02F 1/136286; G02F 1/1333; G02F 1/13454; G02F 1/133; G02F 1/13306; G02F 1/133377; G02F 1/133514; G02F 1/1368; G02F 2203/30; H01L 27/3216; H01L 27/3244
USPC .... 345/87, 55, 694, 89, 103, 88, 77, 83, 90; 349/139, 143, 144, 33, 38, 41, 142, 37, 349/39, 43, 106
See application file for complete search history.

(56) References Cited

U.S. PATENT DOCUMENTS

| 2003/0146893 | A1 | 8/2003 | Sawabe |
| 2008/0049052 | A1* | 2/2008 | Akiyama .......... G02F 1/134309 345/694 |

FOREIGN PATENT DOCUMENTS

| CN | 1828395 A | 9/2006 |
| CN | 1936682 A | 3/2007 |
| CN | 101036080 A | 9/2007 |
| CN | 101308270 A | 11/2008 |
| TW | 200937087 A | 9/2009 |

OTHER PUBLICATIONS

Chinese Office Action and Search Report for Chinese Patent Application No. 201410856585.7, dated Mar. 9, 2018.

* cited by examiner

LIQUID CRYSTAL DISPLAY PANEL AND LIQUID CRYSTAL DISPLAY DEVICE

CROSS REFERENCE TO RELATED APPLICATION

The present application claims benefit of Chinese patent application CN 201410856585.7, entitled "A Liquid Crystal Display Panel and A Liquid Crystal Display Device" and filed on Dec. 31, 2014, the entirety of which is incorporated herein by reference.

TECHNICAL FIELD

The present disclosure relates to the technical field of display, and in particular to a liquid crystal display panel and a corresponding liquid crystal display device.

TECHNICAL BACKGROUND

In a thin film transistor liquid crystal display (TFT-LCD) device, a gamma curve is used to represent the relationship between pixel voltage and pixel brightness. In the liquid crystal display panel, the gamma curve under a central viewing angle is different from that under a squint viewing angle. In this case, color cast would occur to the liquid crystal display panel viewed in a squint angle, and the liquid crystal display panel would appear white-ish. Consequently, the image display effect is influenced. The above problem should be eliminated.

Figure 1:
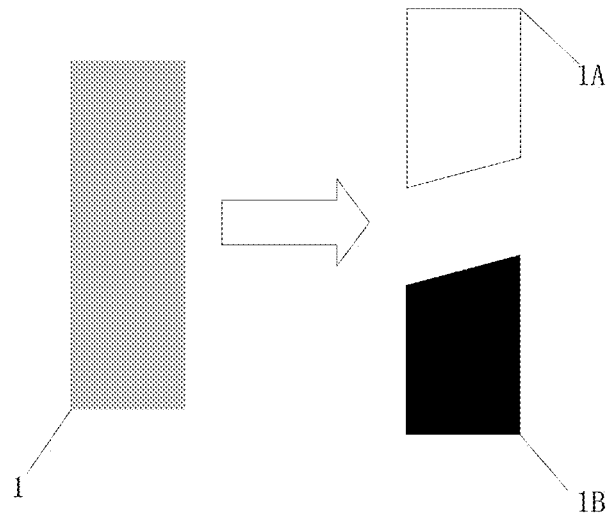
Figure 2:
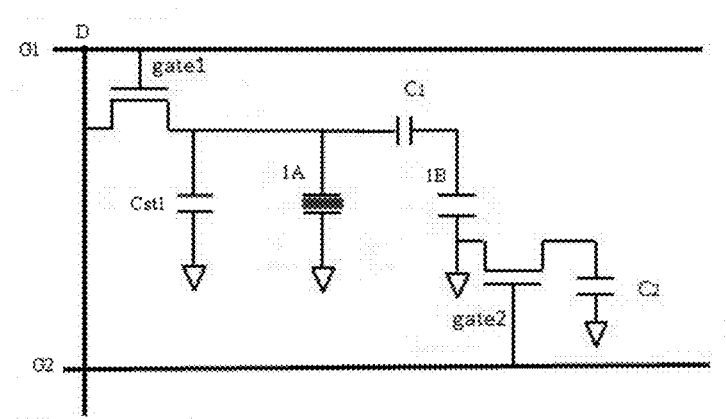

In order to eliminate color cast, a subpixel 1 in a pixel is usually divided into two equal parts, namely part 1A and part 1B as shown in FIG. 1. As shown in FIG. 2, when the liquid crystal display panel is driven, a thin film transistor (TFT) of a first scan line G1 is enabled first, so that a drive voltage can charge parts 1A and 1B with the same amount of electric charges through a data line D, whereby parts 1A and 1B can have the same voltage V1. Subsequently, a portion of the electric charges of part 1B are discharged through a second scan line G2, so that a voltage difference $\Delta V$ can be generated between parts 1A and 1B. In this case, voltage of part 1A is higher, thus forming a higher gray scale; and voltage of part 1B is lower, thus forming a lower gray scale. The higher gray scale and the lower gray scale are mixed to form a medium gray scale, so that the gamma curve under the squint viewing angle can be close to that under the central viewing angle, whereby color cast can be alleviated. However, a gate switch should be added in the above design, causing the production cost of the display panel to increase. In the meantime, the discharging procedure of part 1B renders the time for charging and discharging the pixel to increase.

SUMMARY OF THE INVENTION

In order to solve the above problem, a liquid crystal display panel and a corresponding liquid crystal display device are provided, which can reduce the production cost and reduce time for charging and discharging a pixel, so that the defect of color cast of the liquid crystal display panel can be eliminated.

In a first aspect according to the present disclosure, a liquid crystal display panel is provided, comprising a plurality of scan lines, and a plurality of data lines, which coordinate with the scan lines to form a plurality of subpixel regions, wherein each subpixel region is provided with a subpixel, and each subpixel comprises a plurality of display regions, areas of the display regions being different from each other; and when a scan signal transmitted through the scan line arrives, the display regions each receive a data signal transmitted through a same data line, so that the display regions have different gray scale voltages.

According to an embodiment of the present disclosure, the subpixel comprises a first display region and a second display region, an area ratio of the first display region to the second display region being larger than 1.

According to an embodiment of the present disclosure, the area ratio of the first display region to the second display region of each of all subpixels on the liquid crystal display panel is the same.

According to an embodiment of the present disclosure, the subpixel comprises a switching element having a gate electrically connected with the scan line, a source electrically connected with the data line, and a drain, wherein a branch at which the first display region is located and a branch at which the second display region is located are both electrically connected with the drain of the switching element, so that the gate of the switching element is enabled when the scan signal arrives, and the first display region and the second display region each receive the data signal through the switching element.

According to an embodiment of the present disclosure, a first capacitor is in series connection between the branch at which the second display region is located and the drain of the switching element.

According to an embodiment of the present disclosure, the branch at which the first display region is located is in parallel connection with a circuit formed by the branch at which the second display region is located and the first capacitor.

According to an embodiment of the present disclosure, the liquid crystal display panel further comprises a common line for providing a same common voltage to each of the display regions of the subpixel.

According to an embodiment of the present disclosure, the branch at which the first display region is located and the branch at which the second display region is located of the subpixel are both electrically connected with the common line, so as to receive the common voltage outputted through the common line.

According to an embodiment of the present disclosure, a second capacitor is disposed between the drain of the switching element and the common line for storing electric charges when the switching element is enabled.

In another aspect according to the present disclosure, a liquid crystal display device comprising the above liquid crystal display panel is further provided, comprising a scan signal driver unit for providing scan signal to the scan line, a data signal driver unit for providing data signal to the data line, and a liquid crystal display unit comprising a liquid crystal display panel, wherein liquid crystal display panel comprises a plurality of scan lines, and a plurality of data lines, which coordinate with the scan lines to form a plurality of subpixel regions, wherein each subpixel region is provided with a subpixel, and each subpixel comprises a plurality of display regions, areas of the display regions being different from each other; and when a scan signal transmitted through the scan line arrives, the display regions each receive a data signal transmitted through a same data line, so that the display regions have different gray scale voltages.

The defect of color cast of the liquid crystal display panel can be eliminated, the production cost and time for charging and discharging the pixel can also be reduced through the liquid crystal display panel and the liquid crystal display device according to the present disclosure.

Other features and advantages of the present disclosure will be further explained in the following description and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE ACCOMPANYING DRAWINGS

Figure 3:
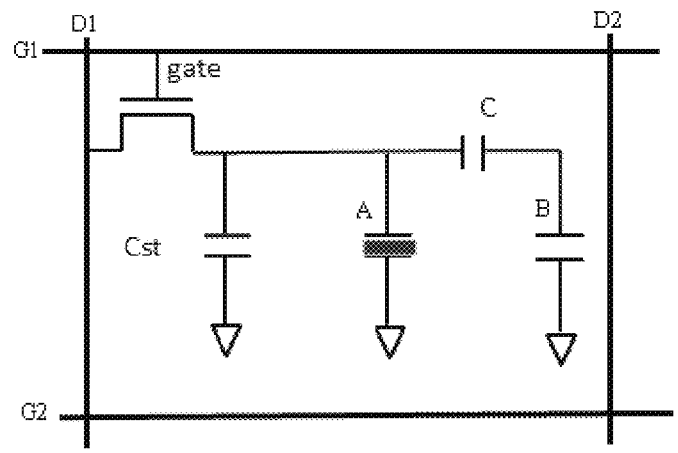
Figure 4:
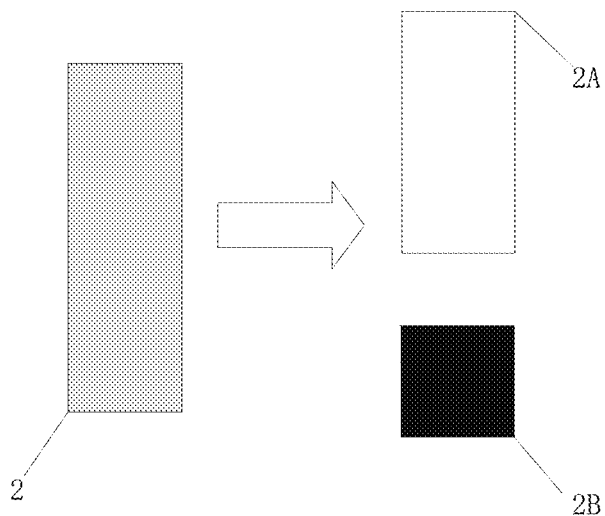
Figure 5:
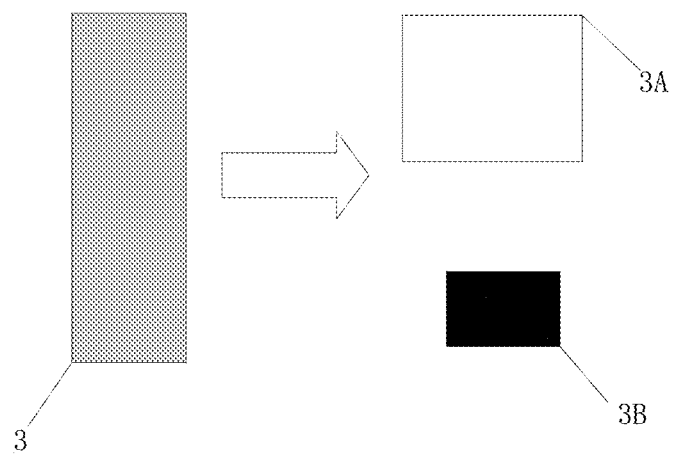
Figure 6:
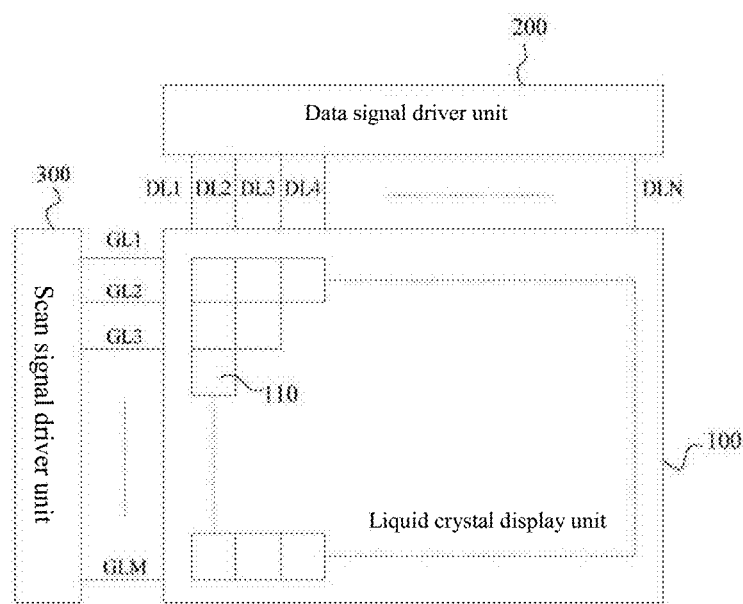

The accompanying drawings, which constitute a part of the description, are used to further illustrate the present disclosure in conjunction with the embodiments. It should be understood that the accompanying drawings should not be construed as limitations to the present disclosure. In the drawings:

FIG. 1 schematically shows a separated structure of an existing subpixel,

FIG. 2 schematically shows a structure of an existing circuit based on the subpixel of FIG. 1, FIG. 3 schematically shows a structure of a circuit of a subpixel according to an example of the present disclosure, FIG. 4 schematically shows a separated structure of the subpixel according to an example of the present disclosure, FIG. 5 schematically shows a separated structure of a subpixel according to another example of the present disclosure, and FIG. 6 schematically shows a structure of a liquid crystal display device according to an example of the present disclosure.

DETAILED DESCRIPTION OF THE EMBODIMENTS

In order to make the objective, technical solution, and the advantages of the present disclosure more clearly, the present disclosure will be illustrated in detail in view of the accompanying drawings.

Due to photoelectric effect of liquid crystal molecules, relationship between an input voltage and an output brightness of a thin film transistor liquid crystal display device (TFT-LCD) can be represented by a non-linear gamma response. The relation curve between the input voltage and the output brightness rendered by the non-linearity is called a gamma curve. The gamma curve can be indicated by $Y=X^{\gamma}$, in which X represents a drive voltage (i.e., a gray scale voltage), Y represents a brightness value under the drive voltage, and γ represents a gamma value. A fixed distortion exists in a liquid crystal display panel due to the gamma response. The larger the gamma value is, the lower the brightness under a low gray scale. Generally, the non-linear gamma response between the brightness of the TFT-LCD and the drive voltage can be compensated through an inverse gamma correction $$\left(Y = X^{\frac{1}{\gamma}}\right)$$

on a video signal. The gamma value is typically in a range of 2.2 to 2.5, and a common gamma value is 2.2. The gamma value of a product TFT-LCD is 2.2.

Due to optical anisotropy of the liquid crystal molecules, an angle formed between a line of sight and the liquid crystal molecules when the liquid crystal display panel is viewed from a squint angle is different from that formed between a line of sight and the liquid crystal molecules when the liquid crystal display panel is viewed from a central angle. In the meantime, light leakage would occur to the liquid crystal molecules when viewed from a squint angle. As a result, when the display panel is viewed from a squint angle, color cast would occur, and the gamma curve thereof would drift upward, rendering the display panel whitened. An inverse gamma correction curve of the TFT-LCD under the central viewing angle would be different from that under the squint viewing angle if the same brightness is desired by a viewer for both viewing angles.

The gamma value of a product TFT-LCD is generally 2.2, which is usually kept constant, thus a corresponding inverse gamma correction curve should also be constant. Although the brightness of the liquid crystal display panel can be adjusted through adjusting the drive voltage, the value of the drive voltage cannot be changed on account of the defect of color cast caused by the viewing angle because different values of the drive voltage respectively correspond to different brightnesses of the entire liquid crystal display panel. In this case, color cast may be alleviated through correcting the gamma curve. Since the gamma curve under squint viewing angle drifts upward relative to the gamma curve under central viewing angle, a gamma curve having relatively low amplitude can be introduced to interact with the gamma curve which has drifted upward, so that the defect of color cast can be eliminated. Essentially, according to an example, a subpixel is divided into two parts, with one part having unchanged display effect and the other part having darker display effect due to the relatively low gamma value thereof.

FIG. 3 schematically shows a structure of a circuit of a subpixel of the liquid crystal display panel according to an example of the present disclosure. The liquid crystal display panel according to the present disclosure will be illustrated in detail in view of FIG. 3.

The liquid crystal display panel comprises a plurality of scan lines and a plurality of data lines. The scan lines and the data lines coordinate with each other to form a plurality of subpixel regions. Each subpixel region is provided with one subpixel. Each subpixel comprises a plurality of display regions respectively having different areas, and thus a pixel electrode of each of the display regions also has a different area. As shown in FIG. 3, a region surrounded by data lines D1 and D2 and scan lines G1 and G2 is a subpixel region.

According to an example of the present disclosure, each subpixel is provided with two display regions having different areas, namely a first display region having a larger area and a second display region having a smaller area. That is, an area ratio of the first display region to the second display region is larger than 1, as shown in FIGS. 4 and 5. As shown in FIG. 4, a subpixel 2 comprises two display regions 2A and 2B respectively having different areas. An area of display region 2A is larger than that of display region 2B. The display regions 2A and 2B have the same width but different lengths, so that a pixel region needs to be divided only once. The above structure is easy to implement.

As shown in FIG. 5, a subpixel 3 also comprises two display regions 3A and 3B respectively having different areas. An area of display region 3A is larger than that of display region 3B. The display regions 3A and 3B have different lengths and different widths. Specific shapes of the two display regions having different areas of each subpixel are not limited to those shown in FIGS. 4 and 5, and can be designed based on the specific shape of the subpixel. In the meantime, since the area of the display region determines an area of a pixel electrode thereon, and the area of the pixel electrode would influence a pixel voltage, the deflection of liquid crystal molecules would be influenced. If one subpixel comprises two separate pixel electrodes, the two pixel electrodes will respectively control the deflection of the liquid crystal molecules. In this case, shapes and area ratio of the two pixel electrodes will influence the deflection of the liquid crystal molecules, thereby influencing gray scale voltage. Because different manners of division can influence an aperture ratio of the subpixel, the shapes and area ratio of the two display regions of each subpixel should be designed according to specific requirements.

Since the pixel electrode can store electric charge, it can be equivalent to a capacitor. As shown in FIG. 3, the pixel electrodes in the two display regions having different areas can be indicated as a capacitor A and a capacitor B. Capacitor A corresponds to the pixel electrode in the first display region which has a relatively large area, and capacitor B corresponds to the pixel electrode in the second display region which has a relatively small area. Accordingly, electric quantity stored in the pixel electrode in the first display region is larger than that stored in the pixel electrode in the second display region, i.e., a capacity of capacitor A is larger than that of capacitor B.

According to an example of the present disclosure, the area ratio of the first display region to the second display region of each of pixels located at different positions is the same, so that color cast can be alleviated and display effect of the display panel under central viewing angle can be ensured. Of course, while the display effect of the display panel under central viewing angle is ensured, in order to alleviate the defect of color cast under large viewing angle of the display panel, the area ratio of the first display region to the second display region of each of subpixels within a range of the central viewing angle can be configured to be the same, and the area ratio of the first display region to the second display region of each of subpixels within ranges of the squint viewing angles can be configured to gradually increase.

According to an example of the present disclosure, each subpixel is provided with a switching element (usually a thin film transistor) comprising a gate, a source, and a drain. The gate of the switching element is electrically connected with the scan line, and the source thereof is electrically connected with the data line. As shown in FIG. 3, a branch (i.e., branch at which capacitor A is located) at which the first display region is located and a branch (i.e., branch at which capacitor B is located) at which the second display region is located are both electrically connected with the drain of the switching element, so that the gate of the switching element is enabled when a scan signal arrives, and the first display region and the second display region receive a same data signal from a same data line through the source of the switching element.

According to an example of the present disclosure, as shown in FIG. 3, a first capacitor C is in series connection between the branch at which the second display region is located and the drain of the switching element. The first capacitor C is in series connection with capacitor B, so that it can divide voltage when a voltage of the branch at which the first capacitor C is located is too high, whereby capacitor B (i.e., the pixel electrode of the second display region) can be protected. In the meantime, the branch at which the first display region of the subpixel is located is in parallel connection with a circuit formed by the branch at which the second display region is located and the first capacitor C (that is, capacitor A is in parallel connection with the branch formed by capacitor B and capacitor C). The first capacitor C can further prevent electric charges stored in capacitor A from flowing to capacitor B when the gate of the switching element is disenabled.

According to an example of the present disclosure, the liquid crystal display panel further comprises a common line for providing a same common voltage to different display regions of each of the subpixels. The common line coordinates with the pixel electrode for providing drive voltage to drive the liquid crystal molecules to deflect. Triangles in FIG. 3 represent respective connections with the common line. When the switching element in the subpixel is enabled, the data signal charges capacitor A and capacitor B through the data line and the switching element. Since the capacity of capacitor A is larger than that of capacitor B, the electric quantity in capacitor A is larger than that in capacitor B after the charging is completed. As a result, a voltage difference between the pixel electrode in the first display region and the common line is larger than that between the pixel electrode in the second display region and the common line, whereby the first display region and the second display region have different gray scale voltages. The first display region has a higher gray scale voltage, and the second display region has a lower gray scale voltage. The higher gray scale and the lower gray scale can be mixed into a medium gray scale. As shown in FIG. 4, a higher scale region 2A and a lower gray scale region 2B are mixed into a medium gray scale subpixel 2. As shown in FIG. 5, a higher scale region 3A and a lower gray scale region 3B are mixed into a medium gray scale subpixel 3. Two different gamma curves are generated through the higher gray scale voltage and the lower gray scale voltage, and interact with each other to eliminate interference from color cast.

According to an example of the present disclosure, a second capacitor Cst is disposed between the drain of the switching element and the common line. The second capacitor Cst is used for storing electric charges when the switching element is enabled. If the electric charges in capacitor A and capacitor B leak when the switching element is disenabled, they can be supplemented through the second capacitor Cst, so that the electric quantity stored in capacitor A and that in capacitor B can remain unchanged, whereby a voltage between capacitor A and the common line and a voltage between capacitor B and the common line can remain unchanged. As a result, the gray scale voltage controlling the deflection of the liquid crystal molecules can be kept unchanged, and image displayed by the subpixel can be guaranteed the same until a next scanning pulse arrives.

According to the present disclosure, only one switching element is provided to charge the pixel electrodes of different display regions of the subpixel, and it is unnecessary to dispose another switching element to discharge excess electric charges in the pixel electrode. In this case, the production cost of the liquid crystal display panel can be reduced. In the meantime, because it is unnecessary to discharge the pixel electrode, the time for charging and discharging the pixel electrode can be reduced.

According to an example of the present disclosure, a liquid crystal display device is further provided. As shown in FIG. 6, the liquid crystal display device comprises a scan signal driver unit 300, a data signal driver unit 200, and a liquid crystal display unit 100.

The scan signal driver unit 300 provides scan signal to a scan line GLM. The data signal driver unit 200 provides data signal to a data line DLN. DL1, DL2, DL3, and DL4 represent data lines, and GL1, GL2, and GL3 represent scan lines. The liquid crystal display unit 100 comprises a plurality of scan lines GLM and a plurality of data lines DLN. The scan lines and the data lines coordinate with each other to form a plurality of subpixel regions 110. A subpixel is disposed in the subpixel region 110. Each subpixel comprises a plurality of display regions having different areas. When a scan signal transmitted through the scan line arrives, the display regions each receive a same data signal transmitted through a same data line, so that the display regions have different gray scale voltages.

The above embodiments are described only for better understanding, rather than restricting, the present disclosure. Any person skilled in the art can make amendments to the implementing forms or details without departing from the spirit and scope of the present disclosure. The scope of the present disclosure should still be subjected to the scope defined in the claims.

The invention claimed is:

1. A liquid crystal display panel, comprising
a plurality of scan lines, and
a plurality of data lines, which coordinate with the scan lines to form a plurality of subpixel regions,
wherein each subpixel region is provided with a subpixel, and each subpixel comprises a plurality of display regions, and wherein the subpixel comprises a first display region and a second display region, and wherein the area ratio of the first display region to the second display region of each of subpixels within a range of central viewing angle of the liquid crystal display panel is configured to be the same, and the area ratio of the first display region to the second display region of each of subpixels within ranges of squint viewing angles is configured to be larger than 1 and gradually increase,
when a scan signal transmitted through the scan line arrives, the display regions each receive a data signal transmitted through a same data line, so that the display regions have different gray scale voltages, wherein the first display region has a brightness higher than that of the second display region.

2. The liquid crystal display panel according to claim 1, wherein the subpixel comprises a switching element having a gate electrically connected with the scan line, a source electrically connected with the data line, and a drain, and
wherein a branch at which the first display region is located and a branch at which the second display region is located are both electrically connected with the drain of the switching element, so that the gate of the switching element is enabled when the scan signal arrives, and the first display region and the second display region each receive the data signal through the switching element.

3. The liquid crystal display panel according to claim 2, wherein a first capacitor is in series connection between the branch at which the second display region is located and the drain of the switching element.

4. The liquid crystal display panel according to claim 3, wherein the branch at which the first display region is located is in parallel connection with a circuit formed by the branch at which the second display region is located and the first capacitor.

5. The liquid crystal display panel according to claim 4, wherein the liquid crystal display panel further comprises a common line for providing a same common voltage respectively to the display regions of the subpixel.

6. The liquid crystal display panel according to claim 5, wherein the branch at which the first display region is located and the branch at which the second display region is located of the subpixel are both electrically connected with the common line, so as to receive the common voltage outputted through the common line.

7. The liquid crystal display panel according to claim 6, wherein a second capacitor is further disposed between the drain of the switching element and the common line for storing electric charges when the switching element is enabled.

8. A display device, comprising:
a scan signal driver unit for providing scan signal to the scan line,
a data signal driver unit for providing data signal to the data line, and
a liquid crystal display unit comprising a liquid crystal display panel,
wherein liquid crystal display panel comprises a plurality of scan lines, and a plurality of data lines, which coordinate with the scan lines to form a plurality of subpixel regions,
wherein each subpixel region is provided with a subpixel, and each subpixel comprises a plurality of display regions, and wherein the subpixel comprises a first display region and a second display region, and wherein the area ratio of the first display region to the second display region of each of subpixels within a range of central viewing angle of the liquid crystal display panel is configured to be the same, and the area ratio of the first display region to the second display region of each of subpixels within ranges of squint viewing angles is configured to be larger than 1 and gradually increase,
when a scan signal transmitted through the scan line arrives, the display regions each receive a data signal transmitted through a same data line, so that the display regions have different gray scale voltages, wherein the first display region has a brightness higher than that of the second display region.

9. The display device according to claim 8, wherein the subpixel comprises a switching element having a gate electrically connected with the scan line, a source electrically connected with the data line, and a drain, and
wherein a branch at which the first display region is located and a branch at which the second display region is located are both electrically connected with the drain of the switching element, so that the gate of the switching element is enabled when the scan signal arrives, and the first display region and the second display region each receive the data signal through the switching element.

10. The display device according to claim 9, wherein a first capacitor is in series connection between the branch at which the second display region is located and the drain of the switching element.

11. The display device according to claim 10, wherein the branch at which the first display region is located is in parallel connection with a circuit formed by the branch at which the second display region is located and the first capacitor.

12. The display device according to claim 11, wherein liquid crystal display panel further comprises a common line for providing a same common voltage respectively to the display regions of the subpixel.

13. The display device according to claim 12, wherein the branch at which the first display region is located and the branch at which the second display region is located of the subpixel are both electrically connected with the common line, so as to receive the common voltage outputted through the common line.

14. The display device according to claim 13, wherein a second capacitor is disposed between the drain of the switching element and the common line for storing electric charges when the switching element is enabled.

* * * * *